No. 782,281. PATENTED FEB. 14, 1905.
J. SIMPSON & L. JOHNSON.
LISTED CORN CULTIVATOR.
APPLICATION FILED JUNE 9, 1904.
3 SHEETS—SHEET 1.
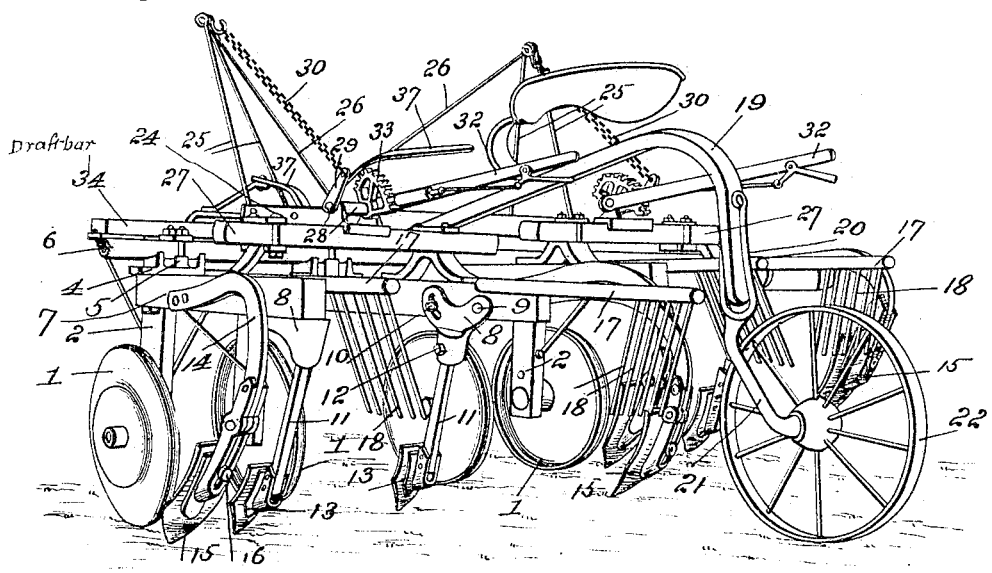
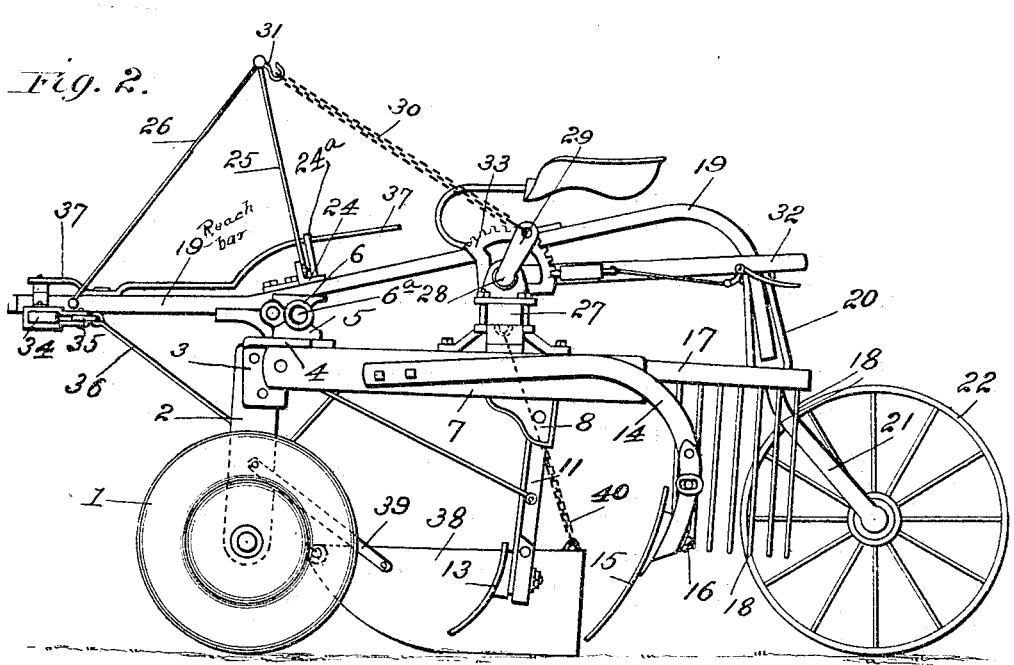

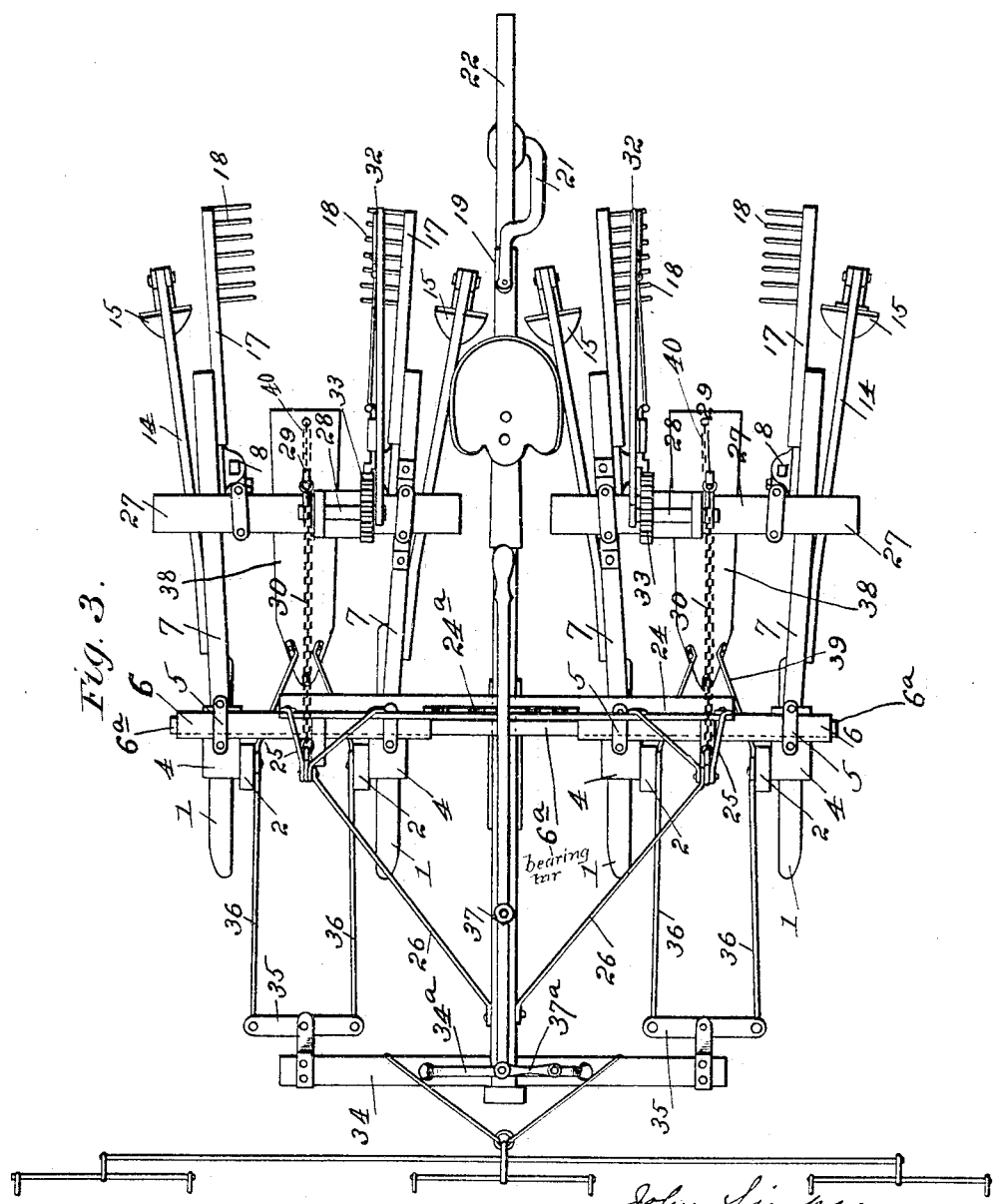

No. 782,281. PATENTED FEB. 14, 1905.
J. SIMPSON & L. JOHNSON.
LISTED CORN CULTIVATOR.
APPLICATION FILED JUNE 9, 1904.
3 SHEETS—SHEET 3.
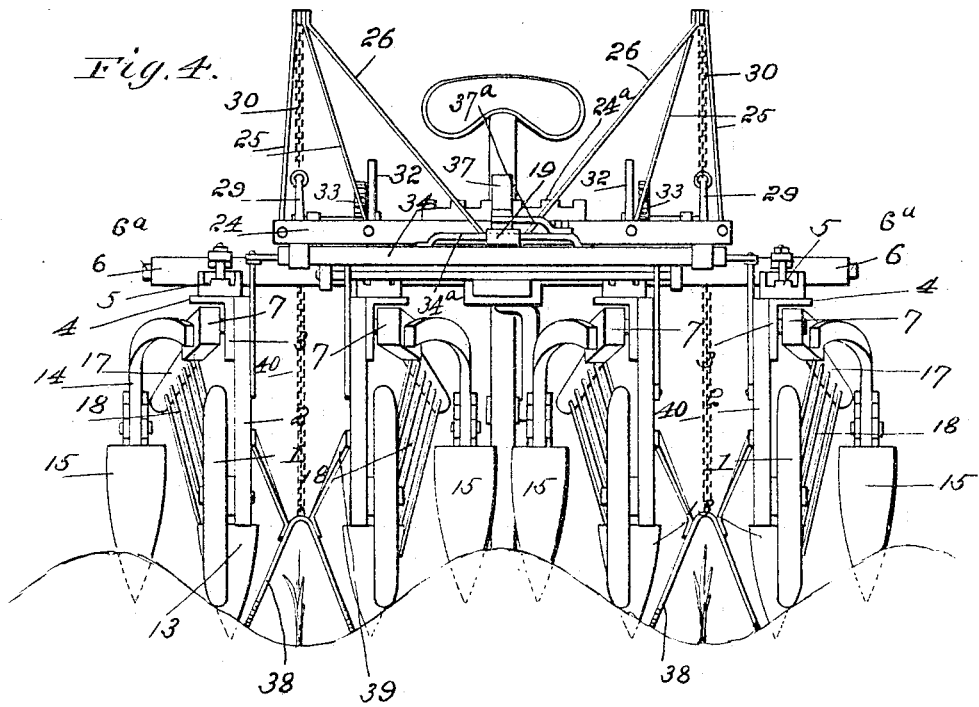
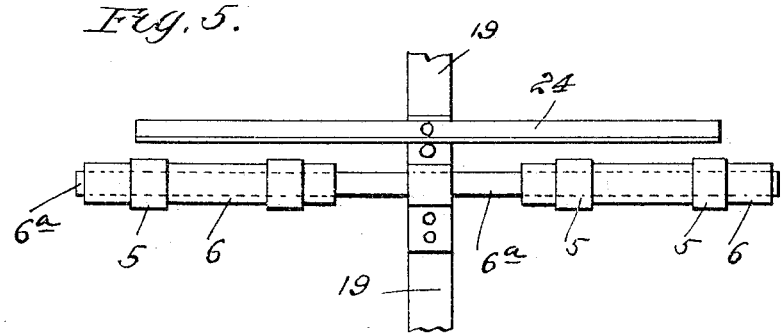
Witnesses
C. Everett Stone
Emma Kaufmann
John Simpson
Lambert Johnson
Inventors
By their Attorneys Davis & Davis No. 782,281.

Patented February 14, 1905.

UNITED STATES PATENT OFFICE.

JOHN SIMPSON AND LAMBERT JOHNSON, OF SUMNER, NEBRASKA.

LISTED-CORN CULTIVATOR.

SPECIFICATION forming part of Letters Patent No. 782,281, dated February 14, 1905.

Application filed June 9, 1904. Serial No. 211,771.

*To all whom it may concern:*

Be it known that we, JOHN SIMPSON and LAMBERT JOHNSON, citizens of the United States, residing at Sumner, county of Dawson, State of Nebraska, have invented certain new and useful Improvements in Listed-Corn Cultivators, of which the following is a specification, reference being had therein to the accompanying drawings, in which—

Figure 1 is a perspective view of the cultivator, the trough-shaped fenders being removed; Fig. 2, a side elevation thereof, showing the trough-shaped fenders; Fig. 3, a plan view; Fig. 4, a front elevation, and Fig. 5 a detail plan view of the bearing-bar and the bearing-sleeves.

Listed corn is planted in a furrow having a ridge on either side, and it has been heretofore difficult to cultivate the corn during the early stages of its growth to keep it free from weeds. One of the great troubles was that the young plants were destroyed and covered with earth by the cultivating means.

It is one of the main objects of this invention to provide a cultivator by which the ground will be broken and the weeds destroyed and which at the same time will protect the young plants and prevent them from being injured or covered with earth.

Another object of the invention is to provide a cultivator adapted for use on sidehills, special means being provided to keep the cultivator in line with the rows.

As shown in the drawings, the machine is designed to cultivate two rows of corn; but it is of course obvious that it may be arranged to cultivate one row or by adding additional devices to cultivate more than two rows. It is preferred, however, to construct it in the form shown.

Referring to the various parts by numerals, 1 designates the transporting-disks, which are mounted in the lower ends of the supporting-standards 2. Four of these disks are provided, arranged axially in line with each other and so spaced apart as to travel one on each side of each row of corn to be cultivated, as shown clearly in Fig. 3.

To the upper end of each supporting-standard 2 is rigidly secured a plate 3, said plates being secured to the outer sides of the outer standards and to the inner sides of the inner standards. Each of these plates is formed at its upper end with an outward-extending horizontal flange 4, which carries the clamp 5. Rigidly secured to the plates of each pair of standards by means of the clamps 5 is a horizontal bearing-sleeve 6, said sleeve serving to rigidly connect together each pair of standards. These bearing-sleeves are loosely mounted on a transverse bearing-bar $6^a$, which is rigidly supported midway its ends, as will be hereinafter set forth.

Rigidly secured on each plate 3 is a rearward-extending cultivator-beam 7, those connected to the two outer standards inclining outward and those connected to the plates of the inner standard inclining inward and toward the longitudinal center line of the machine. Secured to the inner sides of the cultivator-beams, near the rear ends thereof, are holders 8, said holders being pivoted at their rear ends, as at 9 in Fig. 1, and adjustably connected at their forward ends, as at 10 in Fig. 1, so that their downward and forward inclination with respect to the cultivator-beams may be varied as desired. Extending downward and forward from each of these holders 8 and vertically adjustably connected thereto is a bar 11, a bolt 12 being provided to hold it in its adjusted positions. Secured to the lower end of each of these bars is a small shovel or cultivator-tooth 13. It will thus be seen that by varying the adjustment at 10 and by raising or lowering the bar 11 the desired inclination and the proper height of the cultivator-tooth is secured. To the outer side of each beam is secured the rearward and outward extending arm 14, which curves downward at its rear end and carries a large cultivator-shovel 15. This shovel may be vertically adjusted by means of the bolt 16.

The smaller shovels 13 of each pair of cultivator-beams are designed to work on the inner sides of the ridges to destroy the weeds and break up the dirt, while the large shovels of each pair of beams are separated sufficiently to bring them in position to work near the tops of the ridges and are designed to work deeper in the soil than the shovel 13 to thoroughly break up the ground and to practically level the ridges. To prevent the dirt thrown up by the smaller shovels 13 from falling on the plants, trough-shaped fenders 38 are provided, which completely cover the plants between the two shovels. These fenders are connected at their forward ends to the supporting-standards 2 by means of strap-irons 39 and to the bar 27 by means of chains 40.

At the inner side of each cultivator-beam is secured a rearward-extending bar 17, which carries at its rear end downward and inward inclined parallel bars or teeth, which form shields or dirt-checks 18. By describing these teeth as being inwardly inclined it will of course be understood that the bars of each pair of dirt-checks incline toward each other or toward the plants between them. It will of course be understood that during the operating of the machine a row of plants is between each pair of cultivator-beams. The dirt-checks are arranged on the inner side of and slightly in the rear of the large cultivator-shovels 15, so as to prevent the earth turned up by said shovels from falling too far inward toward the plants. The bars of these dirt-checks will also act as breakers and will materially aid in pulverizing the soil. It is obvious that earth will pass between the bars of the dirt-checks in a finely-divided condition, leaving the surface of the ground comparatively level and in a very loose condition.

An upward and rearward extending reach-bar 19 is rigidly secured near its forward end to the transverse connecting-bars $6^a$, midway the ends of said bar. The rear end of this reach is curved downward and carries the downward-extending yoke 20, whose upper end is connected by a horizontal pivot to the reach, said pivot extending longitudinally of the machine in order that the yoke may swing from side to side of the machine. This yoke is provided at its lower end with the downward and rearward inclined arm 21, on the lower end of which is journaled the transporting and guiding wheel 22, said wheel being at the longitudinal center of the machine and slightly in the rear of the large cultivator-shovels 15. The object of mounting this transporting-wheel on a laterally-swinging yoke is to permit it to swing to either side of the longitudinal center of the machine to adjust itself to a vertical position when the machine is used on sidehills. The advantage of this is obvious, as it acts as a brace or prop to maintain the rear end of the machine in line with the furrows and prevents it working gradually downhill, as would be the tendency if such a brace or prop were not provided. This wheel 22 also acts as a caster-wheel when turning the machine. The reach-bar 19 extends forward from the bearing-bar $6^a$ horizontally and carries at its forward end the draft-bar 34, said bar being adjustably supported on the reach-bar by means of a hanger $34^a$ to permit said draft-bar to be adjusted laterally on the reach-bar for a purpose which will be hereinafter described.

Extending transversely of the machine and secured rigidly to the reach-bar slightly in the rear of the bearing-bar $6^a$ is an angle-iron cross-bar 24. To this latter bar are secured frames 25, one of which is located midway between each pair of cultivator-beams. These frames incline upward and slightly forward, their upper ends being connected by downward and forward extending rods 26 to the reach-bar 19.

Secured rigidly to the upper sides of each pair of cultivator-beams is a horizontal transverse bar 27, said bar serving to space the beams a suitable distance apart. Mounted on the upper side of each bar 27 is a short shaft 28, on the outer end of which is provided crank-arm 29. Connecting the free end of this crank-arm with the top of the frame 25 is a chain 30, said chain being detachably connected to said frame by means of a suitable hook device 31. On the inner end of each shaft 28 is rigidly secured a rearward-extending lever 32, and on the bars 27 adjacent each lever is a segment-rack 33, each lever being provided with suitable devices for engaging said rack to hold the lever in its adjusted position. When the rear ends of the levers 32 are forced downward, the strain is brought on the chains 30, which are connected to the upper ends of the frames 25. As these frames are rigidly connected by the rods 26 to the reach-bar 19 forward of the bearing-bar 6, it is obvious that said frames cannot be drawn rearward.
As the cultivator-beams are loosely mounted on the cylindrical bearing-bar 6 by means of the sleeves $6^a$, the rear ends of said bars are free to swing upward. The result, therefore, of forcing downward the rear ends of the levers 32 will be to swing the cultivator-beams upward at their rear ends, said beams turning on the sleeves $6^a$. This upward movement of the beams will cause a slight rearward movement of the lower ends of the standards 2, the draft-bar 34 moving rearward on the reach-bar to accommodate itself to the movement of the standards. By swinging the levers 32 upward and forward the cultivator-beams will be permitted to drop at their rear ends, as is obvious. By this means the cultivator devices may be lifted clear of the ground in order that the machine may be moved readily on its transporting-wheels. It will also be understood that by means of the detachable connection between the chain 30 and the hook 31 said chain may be varied in length as desired to secure the proper adjustment of the parts and to permit the cultivator-shovels to work at the desired depth. As shown in Fig. 2 the cultivator-shovels are lifted above the ground out of operative position.

On each end of the draft-bar is mounted a draft-evener which consists of a bar 35, pivoted midway its ends in straps carried by the draft-bar, the outer ends of said bar being connected by rods 36 to the supporting-standards 2.

Pivoted on the reach-bar forward of the bearing-bar 6ª is a guiding-lever 37, whose forward end is connected by a link 37ª to the hanger 34ª of the draft-bar. The rear end of this lever is in a convenient position to be manipulated by the driver to swing the draft-bar toward either side of the longitudinal center of the machine. Secured to the transverse bar 24 is a suitable keeper 24ª, in the notches of which the guiding-lever may be placed to retain the draft-bar in the desired position. To the draft-bar is secured the draft device with which the draft-animals are connected. It will therefore be seen that by shifting the draft-bar to one or the other side of the longitudinal center of the machine the center of the pull on the machine will be shifted and any tendency of the machine to work laterally—for instance, on sidehills—may be counteracted.

The bearing-sleeves 6 are loosely supported on the bearing-bar 6ª in order that the disks and the cultivator-sleeve may follow automatically the furrows in which the corn is planted. This is a very desirable feature, as the distance between the rows of plants in listed corn varies, and it is important that the cultivator-shovels and shields automatically follow the rows.

Having thus described our invention, what we desire to secure by Letters Patent is—

1. A cultivator for listed corn comprising, transporting-wheels, a pair of cultivator-beams rigidly mounted at their forward ends and diverging rearwardly, a small cultivator-shovel carried by each of said beams, said small shovels being arranged close together, a large cultivator-shovel carried by each of said beams in the rear of the small shovels, these large shovels being arranged a greater distance apart than the smaller shovels, a dirt-check mounted adjacent each of the large shovels, and means for vertically adjusting the cultivator-beams.

2. A listed-corn cultivator comprising, two pairs of transporting-disks, two pairs of cultivator-beams supported thereby, a pair of cultivator-shovels carried by each cultivator-beam, one of said shovels being smaller than the other and the larger one being arranged to work deeper in the soil than the smaller, a dirt-check carried by each cultivator-beam and being arranged to receive the earth from the larger shovel, and means for independently vertically adjusting each pair of cultivator-beams.

3. In a listed-corn cultivator the combination, of transporting-wheels, a pair of cultivator-beams rigidly mounted at their forward ends, adjustable holding devices secured to the inner sides of said cultivator-beams, small cultivator-shovels carried by said holders, outward and rearward extending arms secured to the outer sides of said bars, large cultivator-shovels carried by said bars, and dirt-checks carried by cultivator-beams and arranged to receive the dirt from the large cultivator-shovels.

4. A cultivator for listed corn comprising, transporting-wheels, a pair of cultivator-beams rigidly mounted at their forward ends and diverging rearwardly, a small cultivator-shovel carried by each of said beams, said small shovels being arranged close together, a large cultivator-shovel carried by each of said beams in the rear of the small shovels, these large shovels being arranged a greater distance apart than the smaller shovels, a dirt-check mounted adjacent each of the large shovels, dirt-shields between each pair of smaller shovels to protect the plants, means for connecting said shields to the cultivator, and means for vertically adjusting the cultivator-beams.

5. A cultivator for listed corn comprising a forward horizontal transverse bearing-bar, long bearing-sleeves slidably mounted thereon, a pair of standards connected to each of said sleeves, a transporting-disk carried by each of said standards, a rearward-extending cultivator-beam connected to each standard, cultivator means carried by each of said beams, a forward-extending reach-bar rigidly secured to the bearing-bar between the sleeves, a draft-bar carried by said reach-bar near the forward end thereof, means connecting said draft-bar to the standards, and means for shifting the draft-bar from side to side on the reach.

6. A cultivator for listed corn comprising a forward horizontal transverse bearing-bar, long bearing-sleeves slidably mounted thereon, a pair of standards connected to each of said sleeves, a transporting-disk carried by each of said standards, a rearward-extending cultivator-beam connected to each standard, cultivator means carried by each of said beams, a forward-extending reach rigidly secured to the bearing-bar between the sleeves, a draft-bar carried by said reach near the forward end thereof, means connecting said draft-bar to the standards, and a lever connected to said draft-bar and adapted to be swung from side to side to shift said bar to alter the line of draft.

7. A listed-corn cultivator comprising a supporting-frame, a series of standards, means for rigidly mounting said standards in pairs and permitting them to be moved transversely of the machine, cultivator-beams connected to said standards and extending rearwardly therefrom, cultivator means carried by said beams, a draft-bar, means for supporting said bar and permitting it to have a transverse movement, and means for connecting each end of said draft-bar to the adjacent pair of standards.

8. A cultivator for listed corn comprising, a supporting-frame, a series of standards, means for rigidly mounting said standards in pairs and permitting them to be moved transversely of the machine, cultivator-beams connected to said standards and extending rearwardly therefrom, cultivator means carried by said beams, a draft-bar, means for supporting said bar and permitting it to have a transverse movement, means for connecting each end of said draft-bar to the adjacent pair of standards, and a lever connected to said draft-bar and by which it may be shifted transversely of the machine.

9. A cultivator for listed corn comprising a bearing-bar, a pair of sleeves slidably mounted on said bar, a pair of standards connected to each sleeve, a rearward-extending cultivator-beam connected to each standard, cultivator means carried by each beam, a reach rigidly secured to the bearing-bar between the sleeves, a draft-bar slidably mounted on said reach forward of the standards, means connecting each end of said draft-bar to the adjacent pair of standards, and a lever pivoted on the reach and connected to the draft-bar to swing said bar laterally.

10. A cultivator for listed corn comprising a bearing-bar, a pair of sleeves slidably mounted on said bar, a pair of standards connected to each sleeve, a rearward-extending cultivator-beam connected to each standard, cultivator means carried by each beam, a reach rigidly secured to the bearing-bar between the sleeves, a draft-bar slidably mounted on said reach forward of the standards, means connecting each end of said draft-bar to the adjacent pair of standards, a lever pivoted on the reach and connected to the draft-bar, a laterally-swinging transporting-wheel carried by the rear end of the reach in the rear of the cultivator means.

11. A cultivator for listed corn comprising a bearing-bar, a pair of sleeves slidably mounted on said bar, a pair of standards connected to each sleeve, a rearward-extending cultivator-beam connected to each standard, cultivator means carried by each beam, a reach rigidly secured to the bearing-bar between the sleeves, a draft-bar slidably mounted on said reach forward of the standards, means connecting each end of said draft-bar to the adjacent pair of standards, a lever pivoted on the reach and connected to the draft-bar to swing said bar transversely of the machine, a rear transporting-wheel, a swinging frame carrying said wheel, a horizontal pivot connecting the upper end of said frame to the rear end of the reach above the wheel, for the purpose set forth.

12. A listed-corn cultivator comprising a forward transverse cylindrical bearing-bar, bearing-sleeves mounted thereon, a pair of standards rigidly connected to each sleeve, a transporting-disk carried by each of said standards, rearward-extending cultivator-beams carried by each standard, a reach-bar mounted on the bearing-bar at the center thereof, a transporting-wheel secured to the rear end of said reach-bar, an upward-extending rigid frame carried by the reach above each pair of standards, and means connecting each pair of cultivator-beams to the adjacent rigid upright frame whereby said beams may be vertically adjusted.

13. A listed-corn cultivator comprising a forward transverse cylindrical bearing-bar, bearing-sleeves mounted thereon, a pair of standards rigidly connected to each sleeve, a transporting-disk carried by each of said standards, rearward-extending cultivator-beams carried by each sleeve, a reach-bar mounted on the bearing-bar at the center thereof, a transporting-wheel secured to the rear end of said reach, an upward-extending rigid frame carried by the reach above each pair of standards, a rock-shaft carried by each pair of cultivator-beams, an arm on one end of said shaft, means connecting the free end of said arm to the upright frame, a lever connected to the other end of said rock-shaft, and means for locking said lever in its adjusted position.

14. A cultivator for listed corn comprising a horizontal transverse bearing-bar, long bearing-sleeves slidably mounted thereon, a pair of standards connected to each of said sleeves, a transporting-disk carried by each of said standards, a cultivator-beam carried by each standard, cultivator means carried by each beam, a forward-extending reach secured to the bearing-bar between the sleeves, a draft-bar carried by said reach-bar forward of the standards, draft-evener devices connecting the standards to the draft-bar, a lever connected to said draft-bar and adapted to be swung from side to side to shift said bar and thereby move the sleeves on the bearing-bar to alter the line of draft.

In testimony whereof we hereunto affix our signatures, in the presence of two witnesses, this 23d day of May, 1904.

JOHN SIMPSON.
LAMBERT JOHNSON.

Witnesses:
J. H. MILLHEUS,
R. W. JOHNSON.